(12) United States Patent
Hasegawa et al.

(10) Patent No.: US 12,528,541 B2
(45) Date of Patent: Jan. 20, 2026

(54) SIDE STRUCTURE OF VEHICLE BODY

(71) Applicant: Honda Motor Co., Ltd., Tokyo (JP)

(72) Inventors: Atsushi Hasegawa, Saitama (JP); Hitomi Yamada, Saitama (JP); Ryotaro Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 18/170,489

(22) Filed: Feb. 16, 2023

(65) Prior Publication Data

US 2023/0312003 A1    Oct. 5, 2023

(30) Foreign Application Priority Data

Mar. 31, 2022    (JP) .................... 2022-060147

(51) Int. Cl.
*B62D 25/02*    (2006.01)
*B60J 5/04*    (2006.01)

(52) U.S. Cl.
CPC .......... *B62D 25/025* (2013.01); *B60J 5/0425* (2013.01)

(58) Field of Classification Search
CPC ............................... B60J 5/0425; B60J 5/0429
USPC ........................................ 296/193.05, 193.06
See application file for complete search history.

(56) References Cited

U.S. PATENT DOCUMENTS

| | | | | |
|---|---|---|---|---|
| 4,971,357 A * | 11/1990 | Nakasaki | ............. | B60R 22/22 280/801.1 |
| 6,299,239 B1 * | 10/2001 | Sagawa | ............. | B62D 21/157 296/68.1 |
| 6,808,225 B2 * | 10/2004 | Moriyama | ............. | B60J 5/0479 49/502 |
| 7,328,938 B2 * | 2/2008 | Matsuda | ............. | B62D 21/157 296/68.1 |
| 7,518,782 B2 * | 4/2009 | Maeda | ............. | G09G 3/344 345/98 |

(Continued)

FOREIGN PATENT DOCUMENTS

| | | | | |
|---|---|---|---|---|
| CN | 112744298 A | * | 5/2021 | ............ B62D 25/04 |
| CN | 114222696 | | 3/2022 | |

(Continued)

OTHER PUBLICATIONS

Translation of CN 112744298 (Year: 2021).*

(Continued)

*Primary Examiner* — Amy R Weisberg
*Assistant Examiner* — Veronica M Condo
(74) *Attorney, Agent, or Firm* — JCIPRNET

(57) ABSTRACT

The invention provides a side structure of a vehicle body, which realizes a pillar structure that can efficiently absorb the collision energy in the event of a side collision with a simple configuration to be capable of effectively increasing the vehicle body support rigidity in the event of a vehicle side collision. The side structure of the vehicle body includes a reinforcing member (75) joined to the upper surface of an outer sill (19b) of a side sill (19) on the inner side of an outer pillar (72) of a center pillar (70) in the vehicle width direction; and a bracket (85) for attaching a seat belt retractor (81) to the side sill (19). The bracket (85) is fixed to and interposed between a surface of the reinforcing member (75) on the inner side in the vehicle width direction and the upper surface of an inner sill (19a).

11 Claims, 12 Drawing Sheets

(56) References Cited

U.S. PATENT DOCUMENTS

| | | | | |
|---|---|---|---|---|
| 8,262,153 | B2* | 9/2012 | May | B62D 25/04 |
| | | | | 296/193.06 |
| 9,308,941 | B2* | 4/2016 | Kanaguchi | B62D 25/04 |
| 10,053,154 | B2* | 8/2018 | Kamimura | B62D 27/023 |
| 11,414,133 | B2* | 8/2022 | Han | B62D 21/157 |
| 11,685,444 | B2* | 6/2023 | Nagahama | B62D 25/025 |
| | | | | 296/193.06 |
| 11,718,350 | B2* | 8/2023 | Hasegawa | B62D 27/023 |
| | | | | 296/203.03 |
| 2022/0297759 | A1 | 9/2022 | Nagahama et al. | |
| 2022/0315121 | A1* | 10/2022 | Hasegawa | B62D 25/025 |

FOREIGN PATENT DOCUMENTS

| | | | |
|---|---|---|---|
| DE | 102016014886 A1 * | 6/2018 | B62D 25/04 |
| JP | 2006341687 | 12/2006 | |
| JP | 2009196405 | 9/2009 | |
| JP | 2009262615 | 11/2009 | |
| JP | 2020131953 | 8/2020 | |
| WO | 2021065378 | 4/2021 | |

OTHER PUBLICATIONS

Translation of DE102016014886A (Year: 2018).*
"Office Action of China Counterpart Application", issued on Oct. 24, 2025, with English translation thereof, p. 1-p. 12.

* cited by examiner

View of arrow A

View of arrow B

Cross section along C-C

Cross section along D-D

SIDE STRUCTURE OF VEHICLE BODY

CROSS-REFERENCE TO RELATED APPLICATION

This application claims the priority benefits of Japanese application no. 2022-060147, filed on Mar. 31, 2022. The entirety of the above-mentioned patent application is hereby incorporated by reference herein and made a part of this specification.

BACKGROUND

Technical Field

The disclosure relates to a side structure of a vehicle body.

Description of Related Art

Conventionally, a door is attached to a side of a vehicle body of a vehicle, and a pillar extending upward, which is a part of the vehicle body, is provided on the rear side of the door. Patent Literature 1 (Japanese Patent Laid-Open No. 2009-262615) discloses a structure in which a bulkhead (reinforcing member) is interposed within the cross section of the pillar (center pillar) at the lower end of the pillar, and the lower end of the bulkhead is coupled to a side sill. In the structure of Patent Literature 1, when the load of a collision (side collision) from a lateral side of the vehicle is input to the pillar, the load is transmitted to the side sill and a floor member via the bulkhead.

However, in recent years, there has been a tendency that the weight of a vehicle increases as a large battery or the like is mounted on the vehicle. When the weight of the vehicle increases, the load input to the vehicle body due to a side collision also increases accordingly. Therefore, for such a structure, if the load due to a side collision input to the pillar cannot be sufficiently transmitted to the floor member and cause an excessive load to be applied to the pillar, there is a risk that deformation may occur in the pillar and the surroundings thereof, and the amount of intrusion of vehicle body members such as the pillar into the vehicle interior may increase.

Besides, an emergency locking retractor (ELR) for seat belt may be installed at the root portion of the center pillar. In this case, an opening is formed in an inner frame of the center pillar for attaching the retractor. In the case of such a configuration, when the load due to a side collision is applied to the door beam, the rear end of the door beam is displaced to be pushed toward the inner side in the vehicle width direction (passenger compartment side), and the rear end of the door beam is supported at or near the opening of the center pillar. Therefore, in order to further increase the support rigidity of the vehicle body, there is room for further improvement in the vehicle body structure regarding the opening of the center pillar and the members around.

SUMMARY

A side structure of a vehicle body according to the disclosure includes: a side sill (19) extending in a front-rear direction on an outer side of a floor portion of the vehicle body (10) in a vehicle width direction; and a pillar portion (70) extending upward from the side sill (19). The side sill (19) includes an inner sill (19a) that forms an inner side in the vehicle width direction and an outer sill (19b) that forms an outer side in the vehicle width direction. The pillar portion (70) includes an inner pillar (71) and an outer pillar (72) arranged respectively on the inner side and the outer side in the vehicle width direction. The side structure of the vehicle body includes: a reinforcing member (75) joined to an upper surface of the outer sill (19b) on the inner side of the outer pillar in the vehicle width direction; and a bracket (85) for attaching a seat belt retractor (81) to the side sill (19). The bracket (85) is fixed to and interposed between a surface of the reinforcing member (75) on the inner side in the vehicle width direction and an upper surface of the inner sill (19a).

DESCRIPTION OF THE EMBODIMENTS

Figure 1:
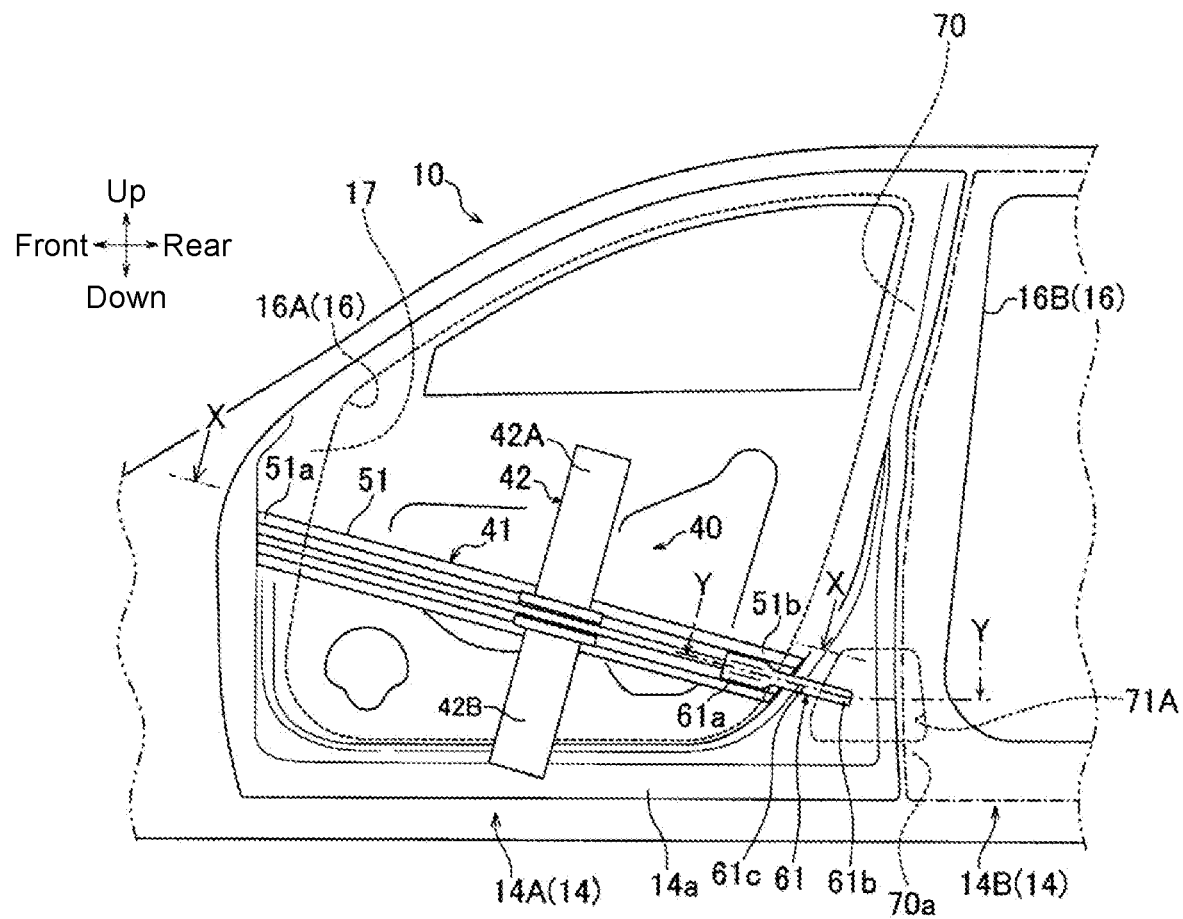
FIG. 1 is a view showing a part of the side surface of the vehicle body to which the side structure of the vehicle body according to an embodiment of the disclosure is applied.

The disclosure provides a side structure of a vehicle body, which realizes a pillar structure that can efficiently absorb the collision energy in the event of a side collision with a simple configuration so as to be capable of effectively increasing the vehicle body support rigidity in the event of a vehicle side collision, and suppresses the deterioration of traffic smoothness while improving the safety of vehicle traffic.

A side structure of a vehicle body according to the disclosure includes: a side sill (19) extending in a front-rear direction on an outer side of a floor portion of the vehicle body (10) in a vehicle width direction; and a pillar portion (70) extending upward from the side sill (19). The side sill (19) includes an inner sill (19a) that forms an inner side in the vehicle width direction and an outer sill (19b) that forms an outer side in the vehicle width direction. The pillar portion (70) includes an inner pillar (71) and an outer pillar (72) arranged respectively on the inner side and the outer side in the vehicle width direction. The side structure of the vehicle body includes: a reinforcing member (75) joined to an upper surface of the outer sill (19b) on the inner side of the outer pillar in the vehicle width direction; and a bracket (85) for attaching a seat belt retractor (81) to the side sill (19). The bracket (85) is fixed to and interposed between a surface of the reinforcing member (75) on the inner side in the vehicle width direction and an upper surface of the inner sill (19a).

According to the side structure of a vehicle body of the disclosure, by providing the bracket fixed to and interposed between the surface of the reinforcing member on the inner side in the vehicle width direction and the upper surface of the inner sill, when the load due to a collision (side collision) from a lateral side of the vehicle is input to the reinforcing member, the reinforcing member is displaced to fall inward in the vehicle width direction with the joint point with the outer sill as a base point, thereby deforming the bracket. As a result, the bracket functions as a so-called crushing member, so the collision energy in the event of a side collision of the vehicle can be efficiently absorbed by the bracket. That is, according to this configuration, since the reinforcing member deforms the bracket (crushing member) while being displaced in a direction of rotating inward and downward in the vehicle width direction around the joint point with the outer sill, the bracket is deformed not only in the vehicle width direction but also in the up-down direction, which makes it possible to efficiently increase the amount of shock absorption of the bracket.

Further, according to this configuration, due to the displacement of the reinforcing member as described above, the bracket not only deforms inward in the vehicle width direction but also deforms downward. Therefore, the amount of deformation of the bracket toward the inner side (interior side) in the vehicle width direction can be reduced. Thus, it is possible to effectively prevent the influence of a side collision from reaching the interior side.

Moreover, in the disclosure described above, the reinforcing member (75) may have a cross-sectional shape that opens toward the outer side in the vehicle width direction, and a closed cross section may be formed by the reinforcing member (75) and a constituent member (73) of the pillar portion (70).

According to this configuration, since the reinforcing member and the constituent member of the pillar portion form a closed cross section, the rigidity of the reinforcing member is improved. Thus, when the load due to a side collision is input to the reinforcing member, the bracket is more easily deformed, so that the load of a side collision can be more effectively absorbed by the bracket.

Further, in the disclosure described above, the bracket (85) may include a front side portion (85a) and a rear side portion (85b) extending from the reinforcing member (75) toward the inner side in the vehicle width direction, and an inner side portion (85c) extending in the front-rear direction on the inner side of the reinforcing member (75) in the vehicle width direction and connecting the front side portion (85a) and the rear side portion (85b).

According to this configuration, the bracket is formed with a substantially C-shaped (substantially U-shaped) cross section that opens outward in the vehicle width direction in plan view. In this way, the bracket that functions as a crushing member is formed with a substantially C-shaped cross section in plan view, so the load input to the reinforcing member due to a side collision can be transmitted from the reinforcing member to the bracket more efficiently. Thus, the bracket is more easily deformed.

Further, in the disclosure described above, the reinforcing member (75) may include a first reinforcing member (75A) arranged in front and a second reinforcing member (75B) arranged in rear, and the front side portion (85a) of the bracket (85) may be connected to the first reinforcing member (75A), and the rear side portion (85b) may be connected to the second reinforcing member (75B).

According to this configuration, by connecting the front side portion and the rear side portion of the bracket to the first reinforcing member and the second reinforcing member respectively, the load input to the reinforcing member due to a side collision can be more effectively transmitted to the bracket, so the bracket is more easily deformed.

Further, in the disclosure described above, the side structure of the vehicle body may include a cover member (90) installed between the first reinforcing member (75A) and the second reinforcing member (75B) in the front-rear direction of the vehicle body (10), and a closed cross section (L) may be formed by the cover member (90) and an upper surface of the outer sill (19b).

According to this configuration, since the cover member installed between the first reinforcing member and the second reinforcing member and the upper surface of the outer sill form a closed cross section, a filler for suppressing vibration and noise, which is filled at the lower end of the pillar portion, can be accommodated within the closed cross section. Thus, the filler can be suppressed from diffusing to the outside. Accordingly, while the reinforcing member and the bracket absorb energy in the event of a vehicle side collision, the function of the filler can effectively suppress the transmission of noise such as road noise and vibration from the road surface to the passenger compartment side.

Further, in the disclosure described above, the outer pillar (72) may include a front wall (72a) extending toward the inner side in the vehicle width direction on a front side, and a rear wall (72b) extending toward the inner side in the vehicle width direction on a rear side, and the reinforcing member (75) may include a front joint portion (83a) joined to the front wall (72a) of the outer pillar (19b), and a rear joint portion (83b) joined to the rear wall (72b).

According to this configuration, by joining the reinforcing member to the front wall and the rear wall of the outer pillar, the load input to the outer pillar in the event of a side collision can be efficiently transmitted to the reinforcing member via the front wall and the rear wall of the outer pillar. Therefore, the reinforcing member can more reliably fall inward in the vehicle width direction, so that the deformation of the bracket can be facilitated more effectively.

Further, in the disclosure described above, the reinforcing member (75) may include a bent portion (79) that bends in the vehicle width direction at an intermediate position in an up-down direction of the reinforcing member, and a notch portion (80) that is formed at a height position overlapping with the bent portion (79), and the front side portion (85a) and the rear side portion (85b) of the bracket (85) may be connected to the reinforcing member (75) across the bent portion (79) vertically.

According to this configuration, the reinforcing member is provided with the bent portion and the notch portion, and the bracket is connected across the bent portion vertically, so when the load due to a side collision is input to the reinforcing member, the portion above the bent portion falls inward in the vehicle width direction first. Since downward deformation of the bracket is facilitated in the portion above the bent portion that falls inward in the vehicle width direction, the amount of deformation of the bracket can be increased.

Further, in the disclosure described above, the front side portion (85a) and the rear side portion (85b) of the bracket (85) may include a bead portion (87) that includes a plurality of elongated protruding portions protruding forward or rearward and extending in the vehicle width direction.

According to this configuration, the bead portion provided on the front side portion and the rear side portion of the bracket can improve the rigidity of the bracket and further increase the amount of energy absorbed when the bracket is deformed.

Further, in the disclosure described above, the inner side portion (85c) of the bracket (85) may include: an attachment portion (89) attaching the retractor (81); and an other bead portion (88) that includes a plurality of elongated protruding portions protruding in the vehicle width direction and extending in the front-rear direction. The attachment portion (89) may be provided on an upper side of the inner side portion (85c), and the other bead portion (88) may be provided on a lower side of the attachment portion (89) of the inner side portion (85c).

According to this configuration, by arranging the attachment portion for attaching the seat belt retractor on the upper side of the inner side portion of the bracket and providing the other bead portion on the lower side of the attachment portion, in the event of a side collision, the seat belt retractor can be guided inward and downward in the vehicle width direction, and the amount of energy absorption associated with the deformation of the bracket can be further increased.

Further, in the disclosure described above, the side structure of the vehicle body may include: a door (14A) attached to be openable and closable to a side of the vehicle body (10); and a door beam (40) installed inside the door (14A). In a state where the door (14A) is closed, at least a part (61c) of the door beam (40) may be arranged at a position overlapping with the reinforcing member (75) and the bracket (85) as viewed in the vehicle width direction.

According to this configuration, by arranging the reinforcing member and the bracket at a position overlapping with at least a part of the door beam as viewed in the vehicle width direction, the energy of the load input to the door beam can be efficiently absorbed by the reinforcing member and the bracket, and the amount of deformation of the door and the pillar portion inward in the vehicle width direction (toward the passenger compartment side) can be suppressed.

Further, in the disclosure described above, the inner pillar (71) may be formed with an opening (71A) in which the retractor (81) is arranged, and the reinforcing member (75) may be arranged at a position lower than an upper edge of the opening (71A) as viewed in the vehicle width direction.

According to this configuration, the reinforcing member is arranged at a position lower than the upper end of the opening of the inner pillar, so there is no concern that the inner pillar may prevent the reinforcing member from falling inward in the vehicle width direction. Therefore, the load input to the reinforcing member in the event of a side collision can be transmitted to the bracket more reliably, and the deformation of the bracket can be facilitated.

The above signs in parentheses indicate reference numerals in the drawings of corresponding components in the embodiments described later for reference.

According to the side structure of the vehicle body of the disclosure, it is possible to effectively increase the vehicle body support rigidity of the door beam in the event of a vehicle side collision with a simple configuration, and suppress the deterioration of traffic smoothness while improving the safety of vehicle traffic.

Embodiments of the disclosure will be described in detail hereinafter with reference to the accompanying drawings. In the following description, the term "front" or "rear" as mentioned refers to a front side being a forward direction or a rear side being a rearward direction of a vehicle body (vehicle) described later. The terms "left" and "right" as mentioned respectively refer to the left and right in a vehicle width direction when the vehicle body (vehicle) is facing forward (front side). The terms "up" and "down" as mentioned refer to an up-down direction (vertical up-down direction) of the vehicle body (vehicle).

Figure 2:
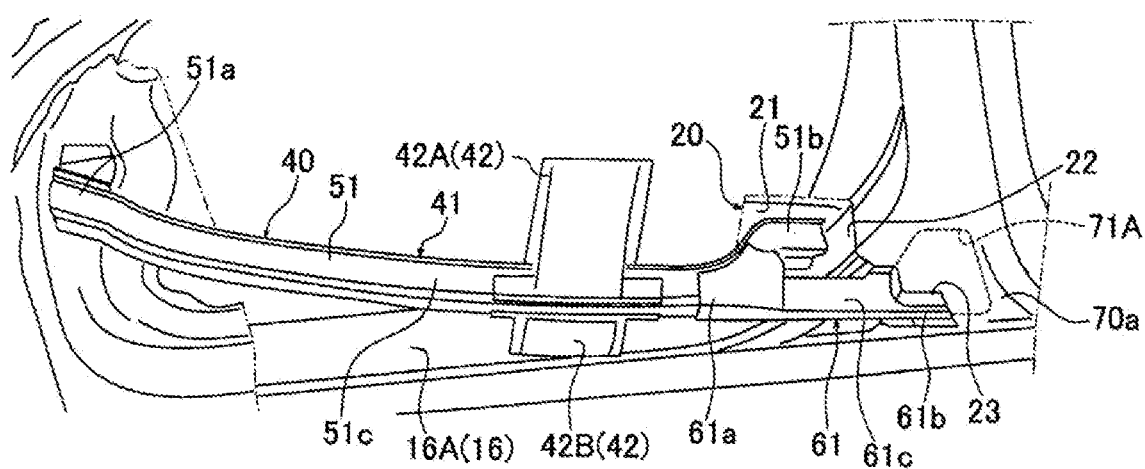
FIG. 2 is a schematic perspective view of the door beam as viewed from above.
Figure 3:
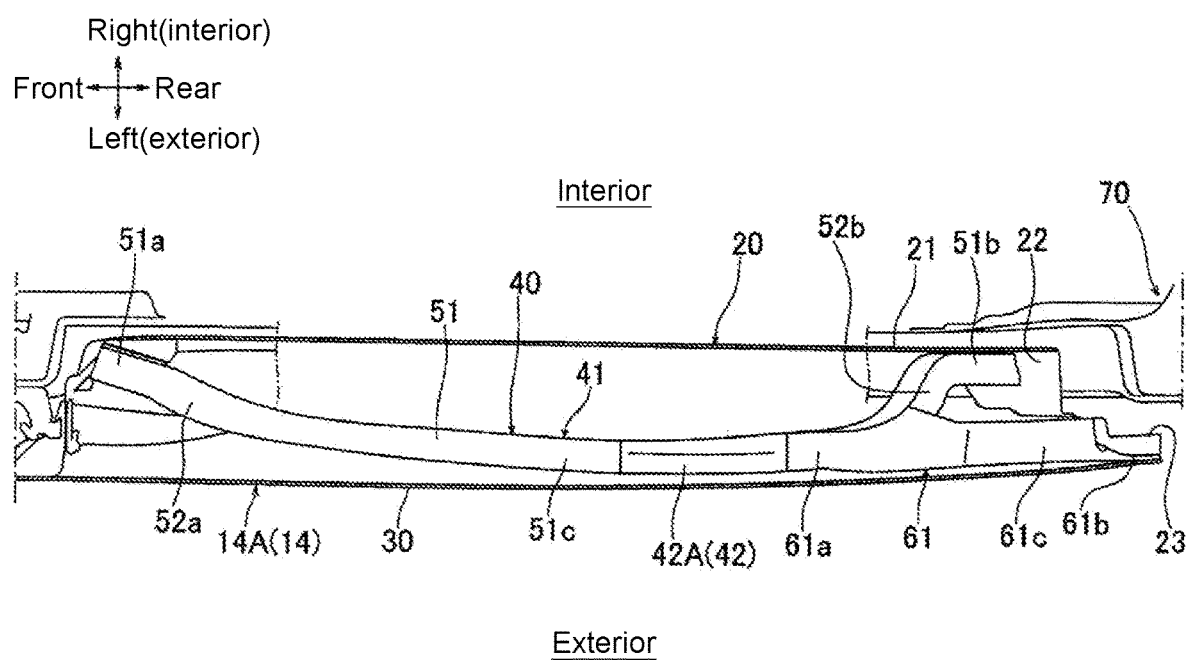
FIG. 3 is a view showing the cross section taken along the line X-X in FIG. 1.

FIG. 1 is a view showing a part of a side surface of a vehicle body to which a side structure of a vehicle body according to an embodiment of the disclosure is applied, and FIG. 2 is a schematic perspective view of a door beam as viewed from above. Further, FIG. 3 is a view showing a cross section taken along the line X-X in FIG. 1. As shown in these drawings, the vehicle to which the side structure of the vehicle body according to the embodiment of the disclosure is applied includes a side door 14 attached to a side of a vehicle body 10. The side door 14 includes a front door 14A and a rear door 14B. Further, the vehicle body 10 is provided with a door opening 16 to which the side door 14 is mounted so as to be openable and closable. The door opening 16 has a front door opening 16A and a rear door opening 16B. In addition, a front pillar 17 that extends in the up-down direction is provided on the front side of the front door opening 16A in the vehicle body 10, and a center pillar (pillar portion) 70 that similarly extends in the up-down direction is provided on the rear side of the front door opening 16A. In the following description, only the front door 14A and the front door opening 16A of the side door 14 and the door opening 16 will be described, and descriptions of the rear door 14B and the rear door opening 16B will be omitted.

The front door 14A includes a door body 14a that opens and closes the front door opening 16A. As shown in FIG. 3, the door body 14a of the front door 14A includes a door inner panel 20 provided on the inner side in the vehicle width direction, a door outer panel 30 provided on the outer side in the vehicle width direction with respect to the door inner panel 20, and a door beam 40 provided between the door inner panel 20 and the door outer panel 30 in the vehicle width direction. The door inner panel 20 and the door outer panel 30 are plate-shaped members made of metal, and the door beam 40 is an elongated member made of metal.

The door beam 40 includes a lateral beam 41 arranged inside the door body 14a of the front door 14A and extending along the front-rear direction of the vehicle body 10, and a vertical beam 42 also arranged inside the door body 14a and extending along the up-down direction of the vehicle body 10.

The door inner panel 20 of the front door 14A has an inner wall (first wall) 21 extending in the front-rear direction of the vehicle body 10 on the inner side in the vehicle width direction, a connection wall (second wall) 22 extending from the inner wall 21 toward the outer side in the vehicle width direction, and an outer wall (third wall) 23 extending in the front-rear direction of the vehicle body 10 from the outer end of the connection wall 22 in the vehicle width direction and joined to the door outer panel 30. The inner wall 21 is a portion forming the inner side of the door inner panel 20 excluding the outer edge (outer peripheral edge), the outer wall 23 is a portion forming the outer edge (outer peripheral edge) of the door inner panel 20, and the inner wall 21 and the outer wall 23 are respectively arranged within the plane located on the inner side (the right side or the interior side in FIG. 3) and within the plane located on the outer side (the left side or the exterior side in FIG. 3) in the vehicle width direction. Then, the connection wall 22 connects the inner wall 21 and the outer wall 23 with a step in the vehicle width direction.

The lateral beam 41 of the door beam 40 includes an arch-shaped beam body 51 and a stay 61 connected to the vicinity of the rear end 51b of the beam body 51. The beam body 51 is an elongated member having a substantially C-shaped (U-shaped) cross section that is convex toward the outer side in the vehicle width direction, the front end 51a and the rear end 51b are fixed portions fixed to the door inner panel 20 (inner wall 21), and the vicinity of the front end 51a and the rear end 51b forms a front curved portion 52a and a rear curved portion 52b that curve toward the outer side in the vehicle width direction respectively, so that the central portion 51c in the longitudinal direction has a shape that bulges toward the outer side in the vehicle width direction.

The stay 61 is an elongated member whose entirety in the longitudinal direction from the front end 61a to the rear end 61b is formed in a substantially linear shape, the rear end 61b is an attachment portion attached to the outer wall 23 of the door inner panel 20 and the door outer panel 30, and a portion on the front side excluding the rear end 61b is a body portion (main portion) 61c having a width dimension in the vehicle width direction larger (thicker) than the rear end 61b. The rear end (attachment portion) 61b of the stay 61 is formed in a substantially flat plate shape, and the body portion (main portion) 61c has a substantially C-shaped cross section that is convex toward the outer side in the vehicle width direction.

As shown in FIG. 3, the rear end 51b of the beam body 51 is fixed to the inner wall 21 of the door inner panel 20. The front end (one end) 61a of the stay 61 is fixed at a position on the front side of the beam body 51 with respect to the rear end 51b and the rear curved portion 52b, and the rear end (the other end) 61b is fixed to the outer wall 23 of the door inner panel 20 and the outer wall 23 of the door inner panel 20.

Figure 4:
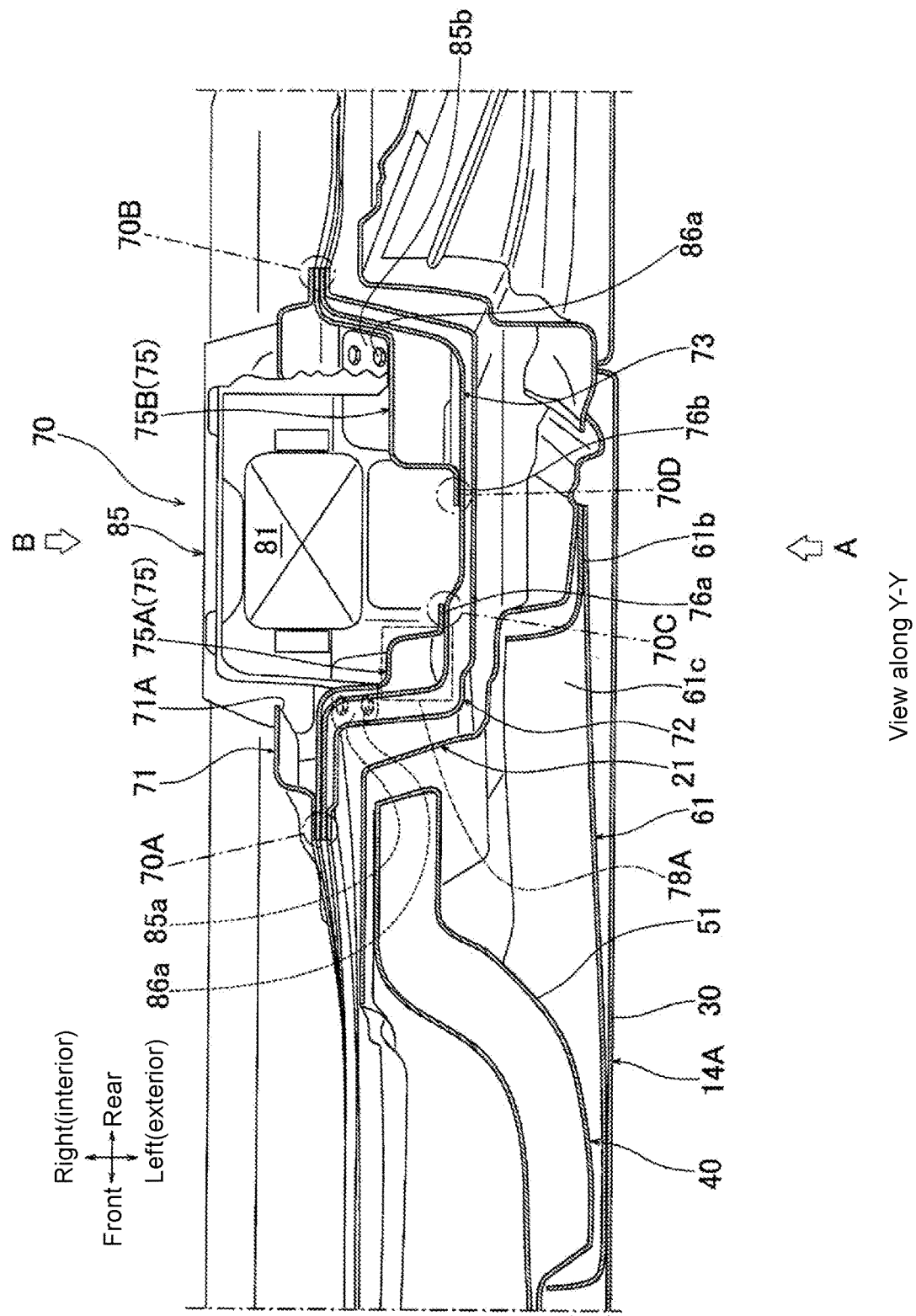
FIG. 4 is a view showing the rear end of the door beam and the lower end of the center pillar, and is a view showing the cross section at the position corresponding to the line Y-Y in FIG. 1.
Figure 5:
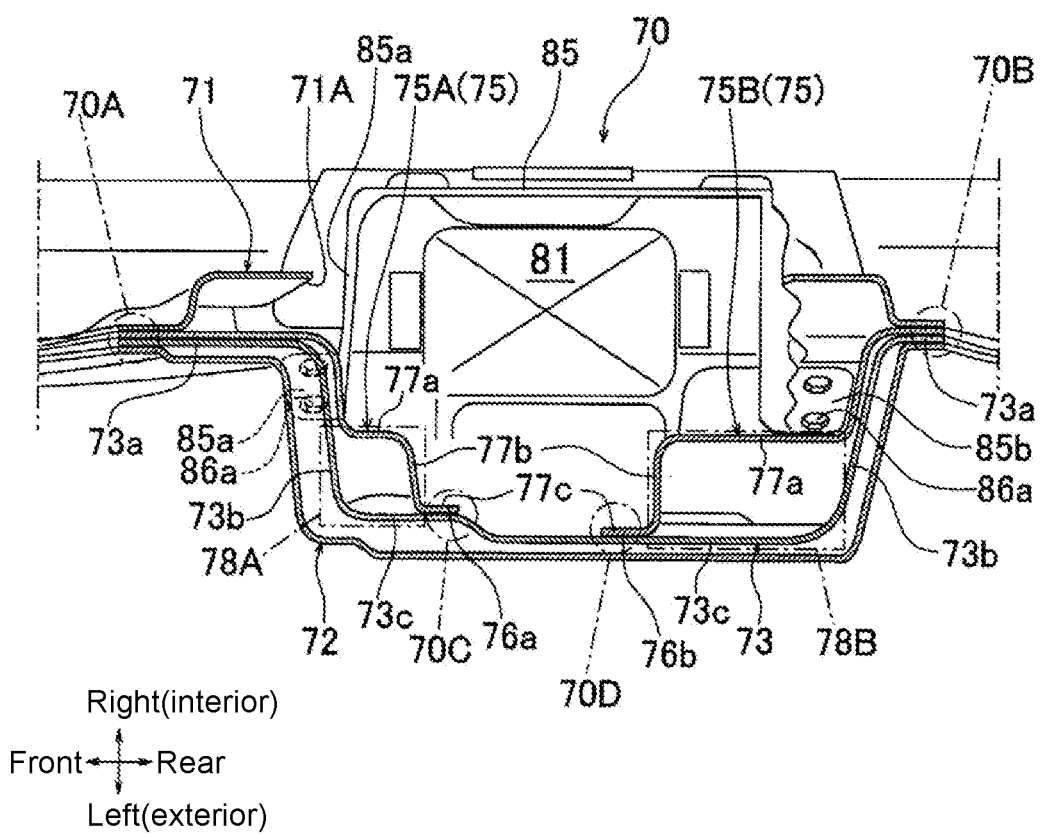
FIG. 5 is a view showing only the lower end of the center pillar, and is a view showing the cross section at the position corresponding to the line Y-Y in FIG. 1.
Figure 6:
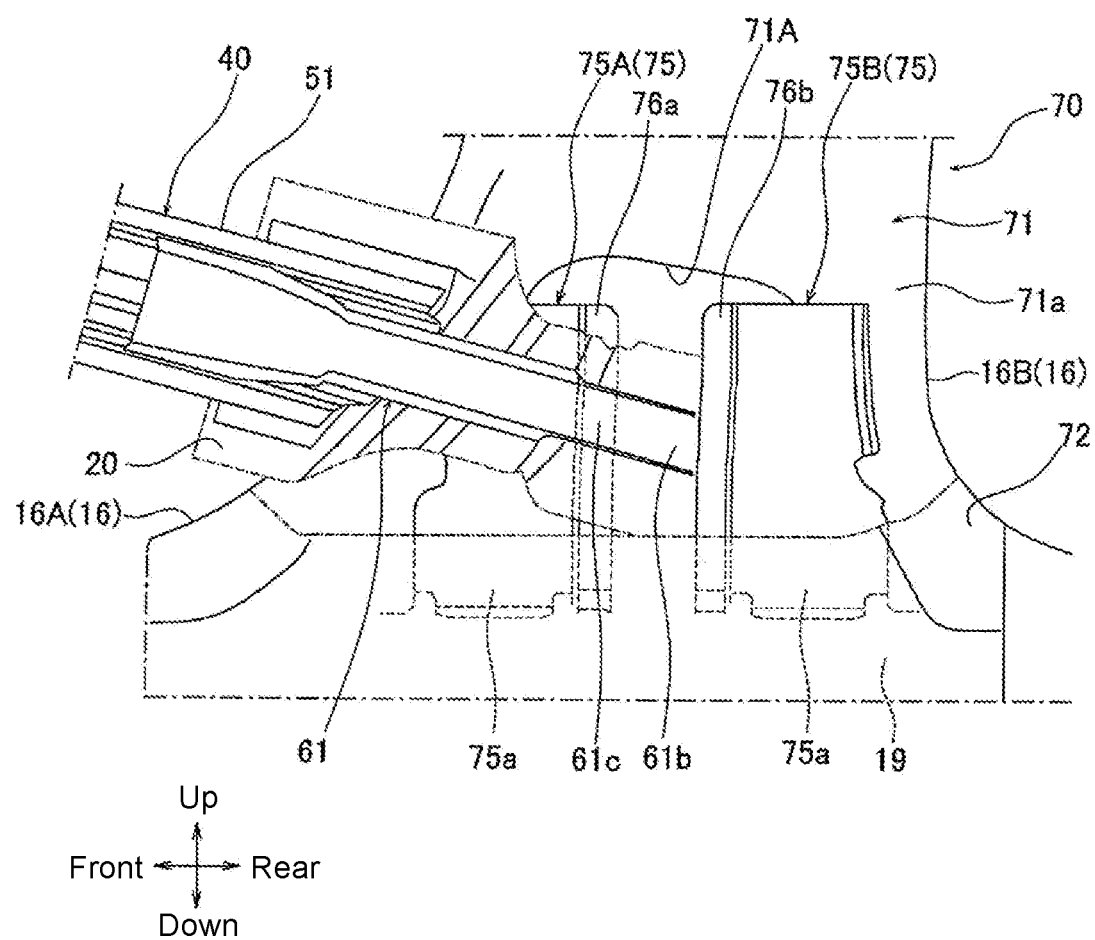
FIG. 6 is a view in the direction of the arrow A in FIG. 4.
Figure 7:
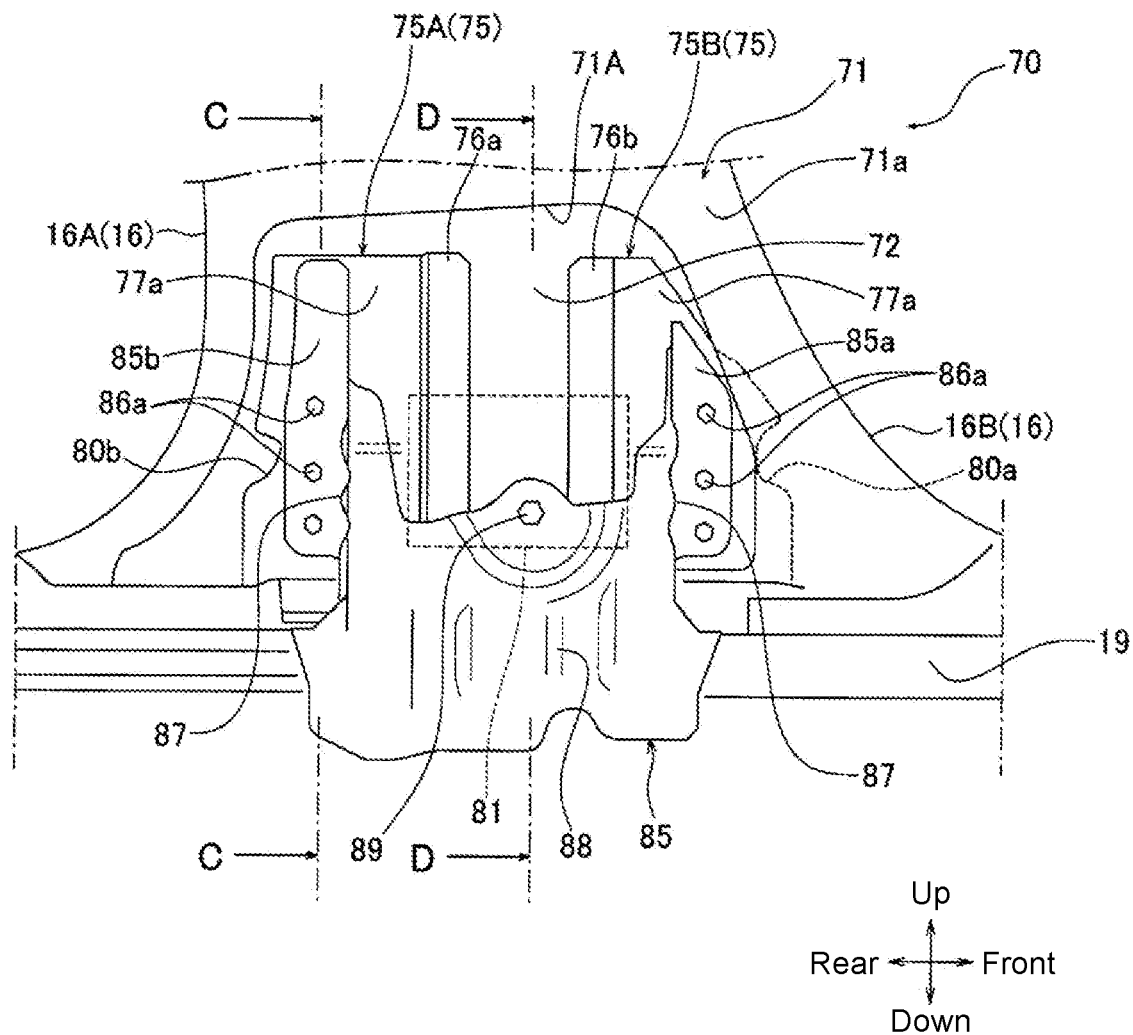
FIG. 7 is a view in the direction of the arrow B in FIG. 4.
Figure 8:
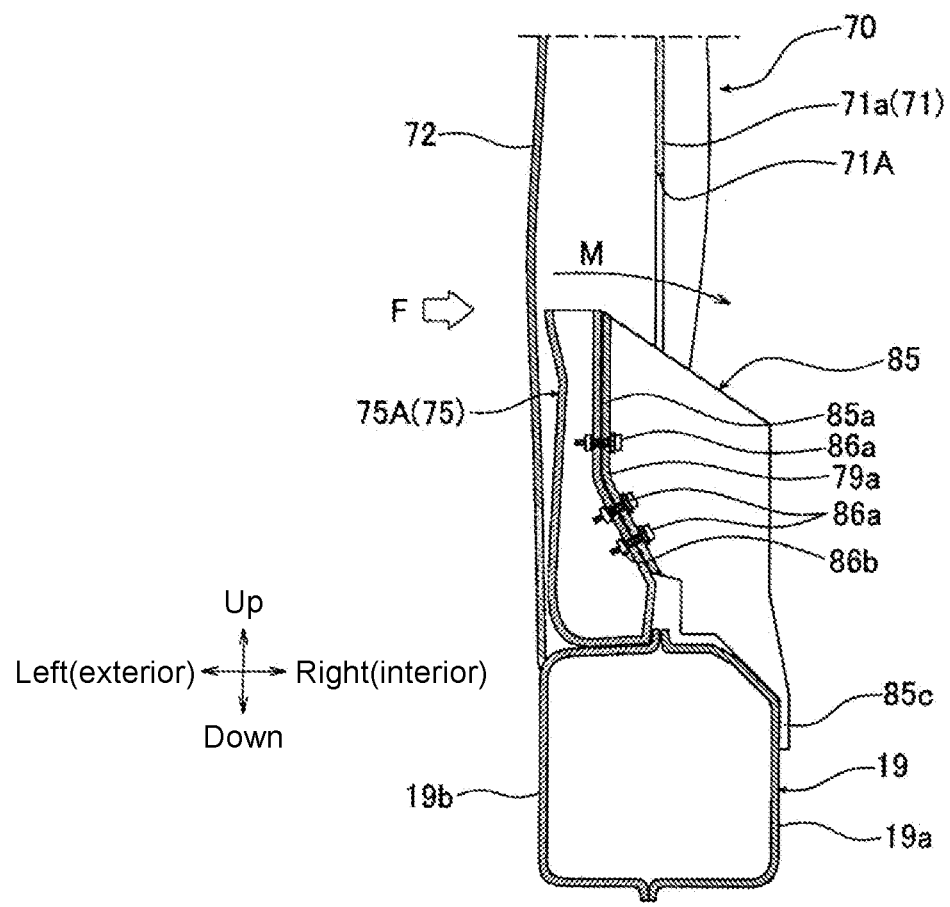
FIG. 8 is a schematic view showing the cross section along the line C-C in FIG. 7.
Figure 9:
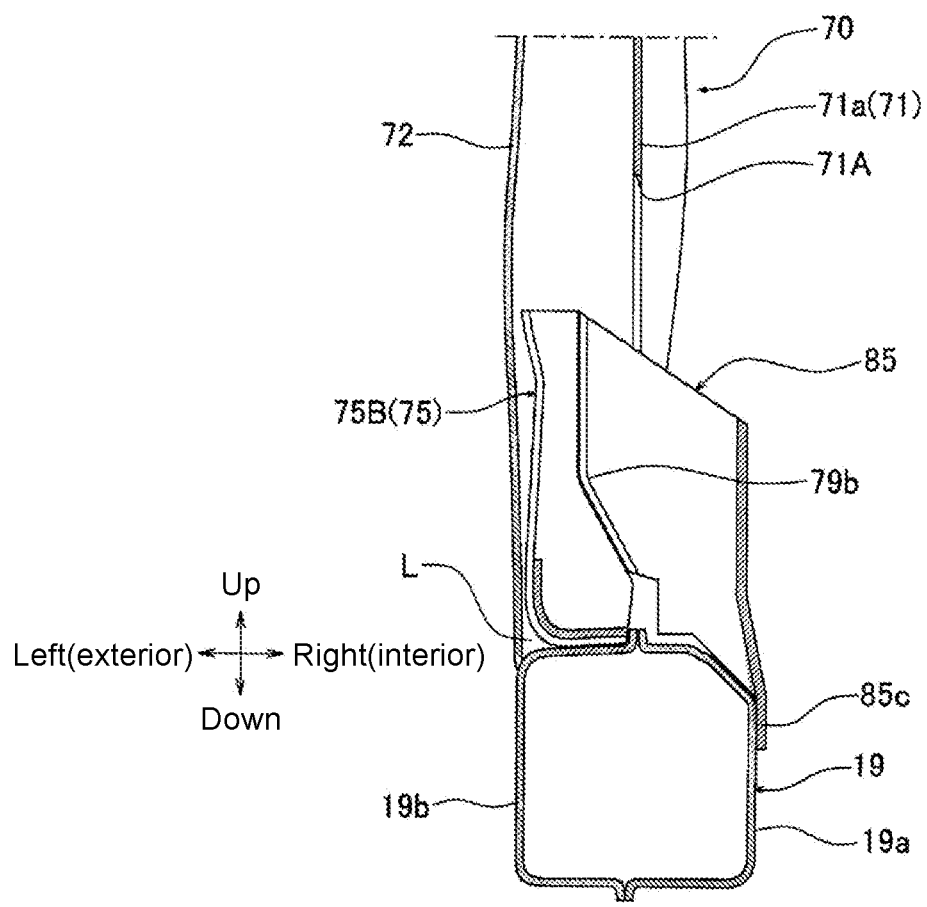
FIG. 9 is a schematic view showing the cross section along the line D-D in FIG. 7.

FIG. 4 and FIG. 5 are views showing the cross section at a position corresponding to the line Y-Y in FIG. 1, FIG. 4 is a view showing the rear end of the door beam and the lower end of the center pillar, and FIG. 5 is a view showing only the lower end of the center pillar. Further, FIG. 6 is a view in the direction of the arrow A in FIG. 4, FIG. 7 is a view in the direction of the arrow B in FIG. 4, FIG. 8 is a schematic view showing the cross section along the line C-C in FIG. 7, and FIG. 9 is a schematic view showing the cross section along the line D-D in FIG. 7.

As shown in these drawings, the center pillar (pillar portion) 70, which is a part of the vehicle body 10, includes a pillar inner panel 71 arranged on the inner side (passenger compartment side) in the vehicle width direction, a pillar outer panel 72 located on the outer side in the vehicle width direction with respect to the pillar inner panel 71, and a stiffener (intermediate panel) 73 provided between the pillar inner panel 71 and the pillar outer panel 72. Then, the end on the front side of the center pillar 70 is provided with a front flange portion (front joint portion) 70A formed by joining the pillar inner panel 71 and the pillar outer panel 72 to the stiffener 73 by welding, and the end on the rear side of the center pillar 70 is provided with a rear flange portion (rear joint portion) 70B formed by joining the pillar inner panel 71 and the pillar outer panel 72 also to the stiffener 73 by welding. Both the front flange portion 70A and the rear flange portion 70B are portions that extend vertically along the longitudinal direction of the center pillar 70. Thus, the center pillar 70 has a rectangular cross section (closed cross section) structure in which the pillar inner panel 71 and the pillar outer panel 72 are joined by the front flange portion 70A and the rear flange portion 70B so that the pillar inner panel 71 and the pillar outer panel 72 close the cross section in plan view. In addition, the stiffener 73 provided between the pillar inner panel 71 and the pillar outer panel 72 has the front side edge joined to the front flange portion 70A and the rear side edge joined to the rear flange portion 70B.

Then, the lower end 71a of the pillar inner panel 71 of the center pillar 70 is formed with an opening 71A in which a seat belt retractor 81 is arranged. A reinforcing member 75 is installed in the opening 71A. In this embodiment, the reinforcing member 75 is divided into two members, a front side member 75A located on the front side in the opening 71A and a rear side member 75B located on the rear side, and these are arranged side by side in the front and rear in the opening 71A. The reinforcing member 75 (the front side member 75A and the rear side member 75B) is a plate-shaped member made of metal, and as shown in FIG. 6, the root portion 75a is fixed to the side sill 19 (sill stiffener 19b) of the vehicle body 10, extends upward from there, and is arranged at a position where the portion on the upper side excluding the root portion 75a overlaps with the opening 71A as viewed from the vehicle width direction. In addition, the upper end of the reinforcing member 75 (the front side member 75A and the rear side member 75B) is arranged at a position lower than the upper edge of the opening 71A. The side sill 19 is a member extending in the front-rear direction of the vehicle body 10 on both sides of the lower portion (floor portion) of the vehicle body 10 in the vehicle width direction, and as shown in FIG. 8, includes an inner sill 19a forming the wall on the inner side in the vehicle width direction and a sill stiffener (outer sill) 19b forming the wall on the outer side in the vehicle width direction, and the inner sill 19a and the sill stiffener 19b form a substantially rectangular closed cross section. Then, the root portion 75a of the reinforcing member 75 (the front side member 75A and the rear side member 75B) are fixed to the upper surface of the sill stiffener 19b of the side sill 19.

As shown in FIG. 5, the stiffener 73 in the center pillar 70 has, in the cross-sectional shape in plan view, a first surface 73a joined to the front flange portion 70A and the rear flange portion 70B, a second surface 73b extending from the first surface 73a toward the outer side in the vehicle width direction, and a third surface 73c extending in the front-rear direction from the outer end of the second surface 73b in the vehicle width direction. Further, the front side member 75A of the reinforcing member 75 has a fourth surface 77a extending toward the rear side at a position separated toward the inner side in the vehicle width direction with respect to the third surface 73c of the stiffener 73, a fifth surface 77b extending from the fourth surface 77a toward the outer side in the vehicle width direction, and a sixth surface 77c extending from the fifth surface 77b toward the rear side and joined to the third surface 73c of the stiffener 73. Similarly, the rear side member 75B of the reinforcing member 75 has a fourth surface 77a extending toward the front side at a position separated toward the inner side in the vehicle width direction with respect to the third surface 73c of the stiffener 73, a fifth surface 77b extending from the fourth surface 77a toward the outer side in the vehicle width direction, and a sixth surface 77c extending from the fifth surface 77b toward the front side and joined to the third surface 73c of the stiffener 73.

The sixth surface 77c of the front side member 75A is a surface formed by the front joint portion 76a (the surface of the front joint portion 76a), and the sixth surface 77c of the rear side member 75B is a surface formed by the rear joint portion 76b (the surface of the rear joint portion 76b). Thus, as shown in FIG. 5, in the first intermediate flange portion (first intermediate joint portion) 70C, the front joint portion 76a (sixth surface 77c) of the front side member 75A is joined to the third surface 73c of the stiffener 73 by welding, and in the second intermediate flange portion (second intermediate joint portion) 70D, the rear joint portion 76b (sixth surface 77c) of the rear side member 75B is joined to the third surface 73c of the stiffener 73.

Thus, the front flange portion 70A is formed by joining the four members of the pillar inner panel 71, the pillar outer panel 72, the stiffener 73, and the front side member 75A, and the rear flange portion 70B is formed by joining the four members of the pillar inner panel 71, the pillar outer panel 72, the stiffener 73, and the rear side member 75B. On the other hand, the first intermediate flange portion 70C is formed by joining the two members of the stiffener 73 and the front side member 75A, and the second intermediate flange portion 70D is formed by joining the two members of the stiffener 73 and the rear side member 75B.

Then, the closed cross sections 78A and 78B, which are substantially rectangular closed cross-sectional shapes, are formed by the second surface 73b and the third surface 73c of the stiffener 73, and the fourth surface 77a and the fifth surface 77b of the reinforcing member 75. In detail, the second surface 73b and the third surface 73c of the stiffener 73, and the fourth surface 77a and the fifth surface 77b of the front side member 75A form the closed cross section 78A on the front side. The second surface 73b and the third surface 73c of the stiffener 73, and the fourth surface 77a and the fifth surface 77b of the rear side member 75B form the closed cross section 78B on the rear side.

In addition, as shown in FIG. 4 and FIG. 5, the joint portion 76 (front joint portion 76a and rear joint portion 76b) of the reinforcing member 75 (front side member 75A and rear side member 75B) are joined to the inner surface of the stiffener 73 (the surface on the inner side in the vehicle width direction).

As shown in FIG. 4 and FIG. 5, the seat belt retractor 81 is arranged on the inner side of the reinforcing member 75 in the vehicle width direction. The retractor 81 is attached to the reinforcing member 75 and the side sill 19 with a bracket (crushing member) 85.

Figure 10:
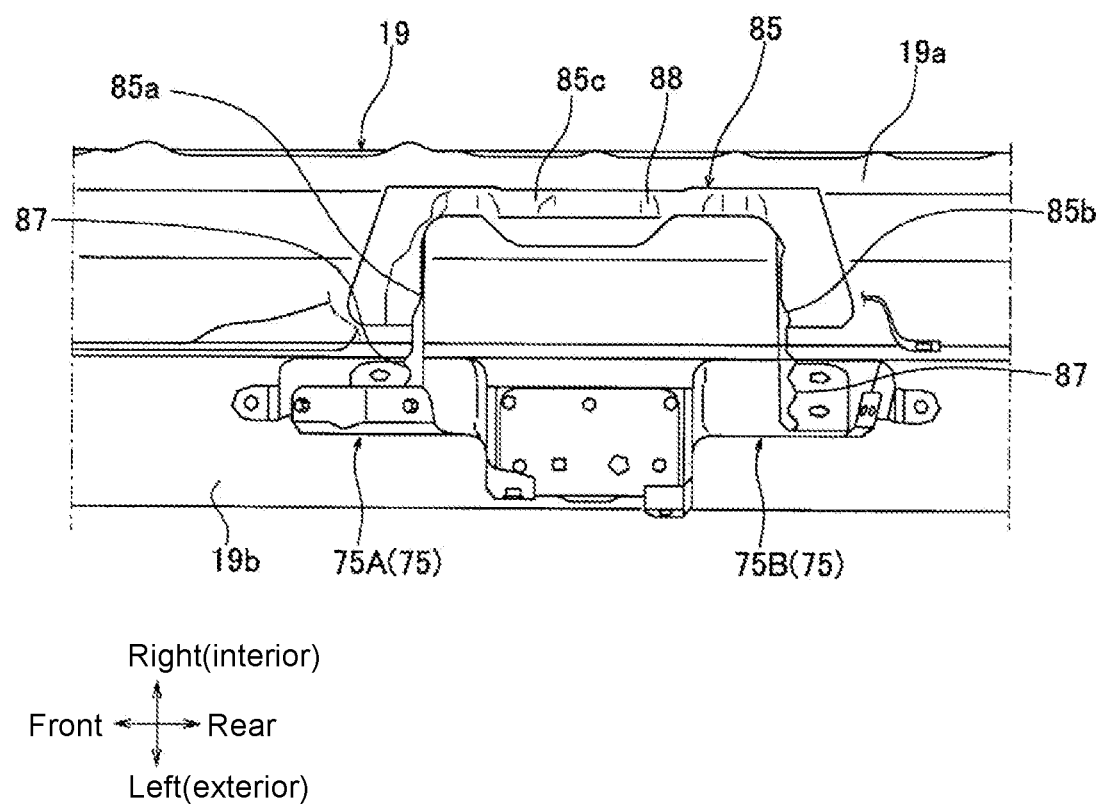
FIG. 10 is a schematic plan view of the reinforcing member and the bracket.
Figure 11:
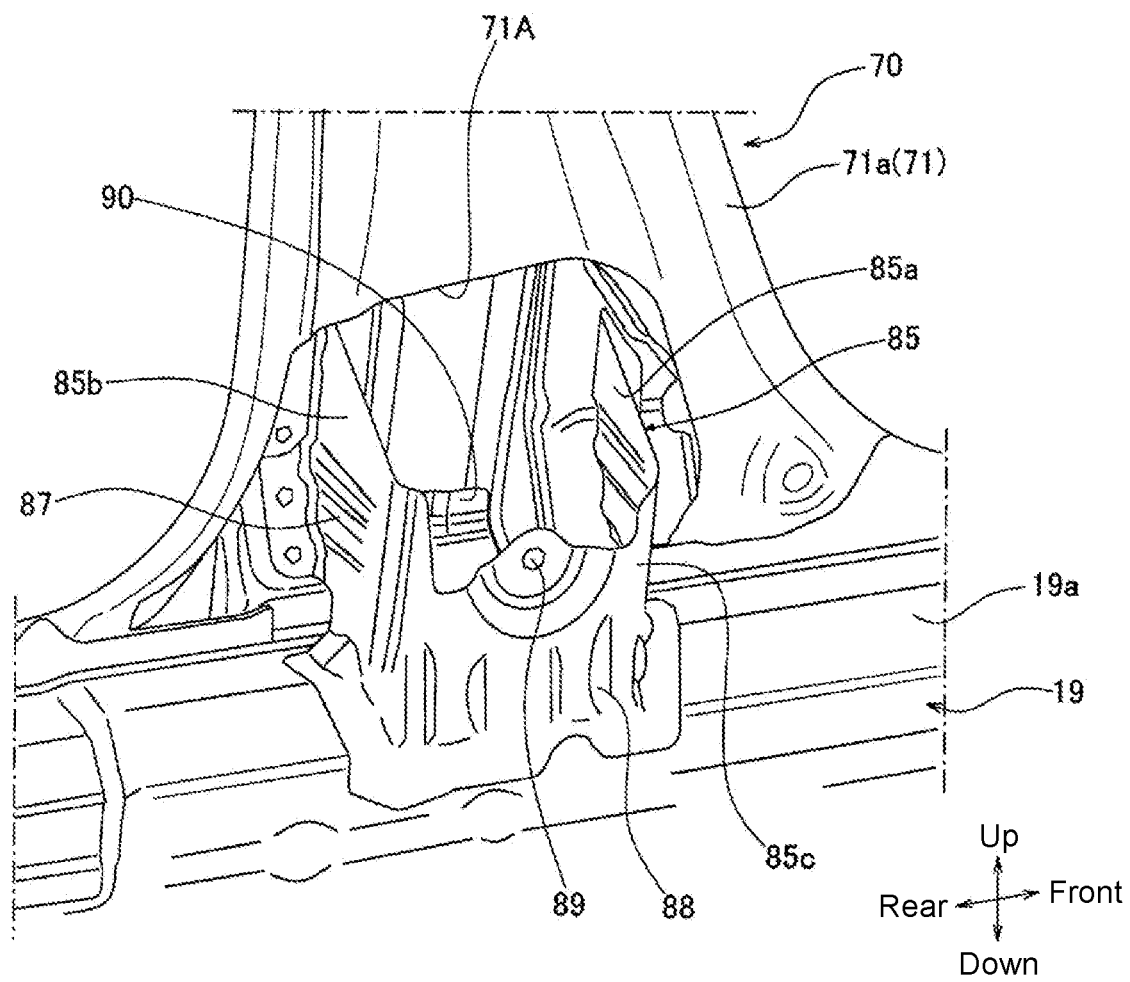
FIG. 11 is a perspective view of the root portion of the center pillar as viewed from the inner side in the vehicle width direction, and is a view showing the attached state of the bracket.

FIG. 10 is a schematic plan view of the reinforcing member and the bracket. Further, FIG. 11 and FIG. 12 are perspective views of the root portion of the center pillar as viewed from the inner side in the vehicle width direction, FIG. 11 is a view showing an attached state of the bracket, and FIG. 12 is a view showing a state where the bracket is removed.

The bracket 85 includes a front side piece (front side portion) 85a and a rear side piece (rear side portion) 85b extending from the reinforcing member 75 toward the inner side in the vehicle width direction, and an inner side piece (inner side portion) 85c that extends in the front-rear direction on the inner side of the reinforcing member 75 in the vehicle width direction and connects the front side piece 85a and the rear side piece 85b. That is, the bracket 85 is arranged in the opening 71A and has a shape surrounding the retractor 81, and the front side piece 85a and the rear side piece 85b thereof are respectively fixed to the inner surfaces (the surfaces on the passenger compartment side) of the front side member 75A and the rear side member 75B of the reinforcing member 75, and the lower end of the inner side piece 85c thereof is fixed to the inner sill 19a of the side sill 19. In detail, the front side piece 85a is fixed to the fourth surface 77a of the front side member 75A by fastening a bolt 86a and a nut 86b, and the rear side piece 85b is fixed to the fourth surface 77a of the rear side member 75B by fastening a bolt 86a and a nut 86b. The bracket 85 supports the retractor 81 in the opening 71A. The bracket 85 is fixed to the surface of the reinforcing member 75 on the inner side in the vehicle width direction and the upper surface of the inner sill 19a and is interposed therebetween. This embodiment shows a case where the reinforcing member 75 and the bracket 85 are fixed by fastening the bolt 86a and the nut 86b, but the reinforcing member 75 and the bracket 85 can also be fixed by welding.

Moreover, as shown in FIG. 4 and FIG. 5, the bracket 85 is arranged so as to surround the right side (interior side) and a part of the front and rear of the retractor 81, the front side member 75A of the reinforcing member 75 is arranged so as to surround the left side (exterior side) and a part of the front side of the retractor 81, and the rear side member 75B of the reinforcing member 75 is arranged so as to surround the left side (exterior side) and a part of the rear side of the retractor 81. Thus, in the cross-sectional shape in plan view, a closed cross section (a closed cross section different from the closed cross sections 78A and 78B) is formed at a position surrounding the retractor 81 by the front side member 75A and the rear side member 75B of the reinforcing member 75 and the bracket 85.

Figure 12:
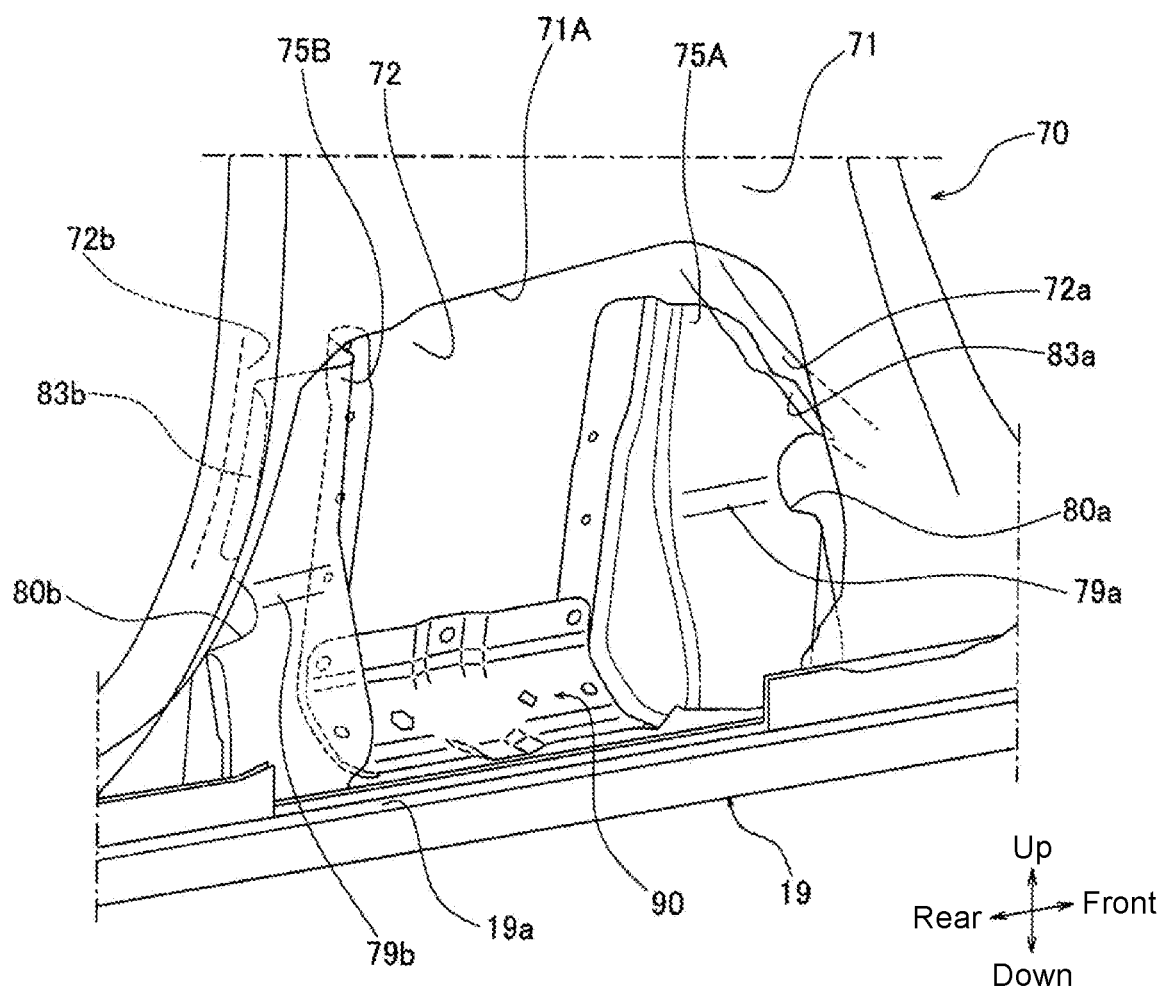
FIG. 12 is a perspective view of the root portion of the center pillar as viewed from the inner side in the vehicle width direction, and is a view showing the state where the bracket is removed.

In addition, as shown in FIG. 9, FIG. 10, and FIG. 12, a cover member 90 is installed between the front side member (first reinforcing member) 75A and the rear side member (second reinforcing member) 75B of the reinforcing member 75 in the front-rear direction of the vehicle body 10. The cover member 90 has a shape formed by slightly curving a flat plate-shaped member, and connects the lower end of the rear end of the front side member 75A and the lower end of the front end of the rear side member 75B in the front-rear direction (in planar shape). Then, as shown in FIG. 9, etc., the cover member 90 is spaced apart from the upper surface of the sill stiffener 19b, thereby defining a gap (space) L between the cover member 90 and the upper surface of the sill stiffener 19b. This gap L has a closed cross section formed by the cover member 90 and the sill stiffener 19b. The closed cross section formed between the cover member 90 and the upper surface of the sill stiffener 19b is a space (gap) in which a filler (spray foam filling) (not shown) for suppressing vibration and noise is filled at the lower end of the center pillar 70.

Further, as shown in FIG. 12, the pillar outer panel 72 includes a front wall 72a extending toward the inner side in the vehicle width direction (projecting toward the inner side) on the front side of the vehicle body 10 in the front-rear direction, and a rear wall 72b similarly extending toward the inner side in the vehicle width direction (projecting toward the inner side) on the rear side of the vehicle body 10 in the front-rear direction. The front wall 72a has a surface facing the rear side of the vehicle body 10 in the front-rear direction, and the rear wall 72b has a surface facing the front side of the vehicle body 10 in the front-rear direction. Then, the front side member 75A of the reinforcing member 75 includes a front joint portion 83a joined to the front wall 72a of the pillar outer panel 72, and the rear side member 75B includes a rear joint portion 83b joined to the rear wall 72b of the pillar outer panel 72. Both the front joint portion 83a and the rear joint portion 83b are flange-shaped protruding pieces, and these are joined to the front wall 72a and the rear wall 72b by welding. The front joint portion 83a and the rear joint portion 83b can also be fixed to the front wall 72a and the rear wall 72b by fastening bolts (not shown) instead of welding.

In addition, as shown in FIG. 8 and FIG. 12, the reinforcing member 75 includes a bent portion 79 (79a, 79b) bent in the vehicle width direction at an intermediate position in the up-down direction, and a notch portion 80 (80a, 80b) formed at a height position (substantially the same height position) overlapping with the bent portion 79 on the front side and the rear side of the bent portion 79. In detail, the front side member 75A of the reinforcing member 75 includes the bent portion 79a provided on the surface on the inner side in the vehicle width direction and the notch portion 80a provided at the edge on the front side. The bent portion 79a extends linearly along the front-rear direction of the vehicle body 10, and at this bent portion 79a, the surface on the upper side and the surface on the lower side of the front side member 75A are slightly bent in a substantially dogleg shape. The notch portion 80a is a laterally substantially U-shaped recess (notch) formed at a position at the front end of the bent portion 79a. Further, the rear side member 75B of the reinforcing member 75 includes the bent portion 79b provided on the surface on the inner side in the vehicle width direction and the notch portion 80b provided at the edge on the front side. The bent portion 79b extends linearly along the front-rear direction of the vehicle body 10, and at this bent portion 79b, the surface on the upper side and the surface on the lower side of the rear side member 75B are slightly bent in a substantially dogleg shape. The notch portion 80b is a laterally substantially U-shaped recess (notch) formed at a position as the rear end of the bent portion 79b.

Then, the front side piece 85a and the rear side piece 85b of the bracket 85 are connected to the reinforcing member 75 across the bent portion 79 (79a, 79b) vertically. That is, the front side piece 85a and the rear side piece 85b are connected (fixed) to both the upper side and the lower side of the bent portion 79 on the surface of the reinforcing member 75 on the inner side in the vehicle width direction.

In addition, as shown in FIG. 10 and FIG. 11, the front side piece 85a and the rear side piece 85b of the bracket 85 are respectively formed with a bead portion 87 including a plurality of elongated protruding portions that protrude forward or rearward and extend in the vehicle width direction. That is, the bead portions 87 of the front side piece 85a and the rear side piece 85b are formed in a wavy shape (concave and convex shape) that the surfaces (cross sections) thereof have a plurality of concave and convex parts as viewed in the vehicle width direction. Further, the inner side piece 85c of the bracket 85 includes an attachment portion 89 for attaching the seat belt retractor 81 in the upper portion, and the other bead portion 88 including a plurality of elongated protruding portions that protrude in the vehicle width direction and extend in the front-rear direction is formed on the lower side of the attachment portion 89. The other bead portion 88 of the inner side piece 85c is formed in a wavy shape (concave and convex shape) that the surface (cross section) thereof has a plurality of concave and convex parts as viewed from the front-rear direction.

As described above, the side structure of the vehicle body 10 according to this embodiment includes: the side sill 19 extending in the front-rear direction on the outer side of the floor portion of the vehicle body 10 in the vehicle width direction; and the center pillar (pillar portion) 70 extending upward from the side sill 19. The side sill 19 includes the inner sill 19a that forms the inner side in the vehicle width direction and the sill stiffener (outer sill) 19b that forms the outer side in the vehicle width direction. The center pillar 70 includes the pillar inner panel 71 and pillar outer panel 72 arranged respectively on the inner side and the outer side in the vehicle width direction. The side structure of the vehicle body includes: the reinforcing member 75 joined to the upper surface of the outer sill 19b on the inner side of the outer pillar 71 in the vehicle width direction; and the bracket 85 for attaching the seat belt retractor 81 to the side sill 19. The bracket 85 is fixed to and interposed between the surface of the reinforcing member 75 on the inner side in the vehicle width direction and the upper surface of the inner sill 19a.

According to the side structure of the vehicle body 10 of this embodiment, by providing the bracket 85 fixed to and interposed between the surface of the reinforcing member 75 on the inner side in the vehicle width direction and the upper surface of the inner sill 19a, as shown in FIG. 8, when the load F due to a collision (side collision) from a lateral side of the vehicle body 10 is input to the reinforcing member 75, the reinforcing member 75 is displaced to fall inward in the vehicle width direction with the joint point (lower end) with the sill stiffener 19b as a base point (displaced in the direction indicated by the arrow M in the drawing), thereby deforming the bracket 85. As a result, the bracket 85 functions as a so-called crushing member, so the collision energy in the event of a side collision of the vehicle can be efficiently absorbed by the bracket 85. That is, according to this configuration, since the reinforcing member 75 deforms the bracket 85 while being displaced in a direction of rotating inward and downward in the vehicle width direction around the joint point with the sill stiffener 19b, the bracket 85 is deformed not only in the vehicle width direction but also in the up-down direction, which makes it possible to efficiently increase the amount of shock absorption of the bracket 85.

Further, according to this configuration, due to the displacement of the reinforcing member 75 as described above, the bracket 85 not only deforms inward in the vehicle width direction but also deforms downward. Therefore, the amount of deformation of the bracket 85 toward the inner side (interior side) in the vehicle width direction can be reduced. Thus, it is possible to effectively prevent the influence of a side collision from reaching the interior side.

Further, in this embodiment, the reinforcing member 75 has a cross-sectional shape that opens toward the outer side in the vehicle width direction, and a closed cross section is formed by the reinforcing member 75 and the stiffener 73 which is a constituent member of the center pillar 70.

According to this configuration, since the reinforcing member 75 and the stiffener 73 which is a constituent member of the center pillar 70 form a closed cross section, the rigidity of the reinforcing member 75 is improved. Thus, when the load due to a side collision is input to the reinforcing member 75, the bracket 85 is more easily deformed, so that the load of a side collision can be more effectively absorbed by the bracket 85.

Further, in this embodiment, the bracket 85 includes the front side piece (front side portion) 85a and the rear side piece (rear side portion) 85b extending from the reinforcing member 75 toward the inner side in the vehicle width direction, and the inner side piece (inner side portion) 85c extending in the front-rear direction on the inner side of the reinforcing member 75 in the vehicle width direction and connecting the front side piece 85a and the rear side piece 85b.

According to this configuration, the bracket 85 is formed with a substantially C-shaped (substantially U-shaped) cross section that opens outward in the vehicle width direction in plan view. In this way, the bracket 85 that functions as a crushing member is formed with a substantially C-shaped cross section in plan view, so the load input to the reinforcing member 75 due to a side collision can be transmitted from the reinforcing member 75 to the bracket 85 more efficiently. Thus, the bracket 85 is more easily deformed.

Further, in this embodiment, the reinforcing member 75 includes the front side member (first reinforcing member) 75A arranged in front and the rear side member (second reinforcing member) 75B arranged in rear, and the front side piece 85a of the bracket 85 is connected to the front side member 75A, and the rear side piece 85b is connected to the rear side member 75B.

According to this configuration, by connecting the front side piece 85a and the rear side piece 85b of the bracket 85 to the front side member 75A and the rear side member 75B of the reinforcing member 75 respectively, the load input to the reinforcing member 75 due to a side collision can be more effectively transmitted to the bracket 85, so the bracket 85 is more easily deformed.

Further, in this embodiment, the side structure of the vehicle body includes the cover member 90 installed between the front side member 75A and the rear side member 75B in the front-rear direction, and the closed cross section L is formed by the cover member 90 and the upper surface of the sill stiffener 19b.

According to this configuration, a filler for suppressing vibration and noise, which is filled at the lower end 70a of the center pillar 70, can be accommodated within the closed cross section L. Thus, the filler can be suppressed from diffusing to the outside. Accordingly, while the reinforcing member 75 and the bracket 85 absorb energy in the event of a vehicle side collision, the function of the filler can effectively suppress the transmission of noise such as road noise and vibration from the road surface to the passenger compartment side.

Further, in this embodiment, the outer pillar 72 of the center pillar 70 includes the front wall 72a extending toward the inner side in the vehicle width direction on the front side, and the rear wall 72b extending toward the inner side in the vehicle width direction on the rear side, and the reinforcing member 75 includes the front joint portion 83a joined to the front wall 72a of the outer pillar 72, and the rear joint portion 83b joined to the rear wall 72b.

According to this configuration, by joining the reinforcing member 75 to the front wall 72a and the rear wall 72b of the pillar outer panel 72, the load input to the pillar outer panel 72 in the event of a side collision can be efficiently transmitted to the reinforcing member 75 via the front wall 72a and the rear wall 72b of the pillar outer panel 72. Therefore, the reinforcing member 75 can more reliably fall inward in the vehicle width direction, so that the deformation of the bracket 85 can be facilitated more effectively.

Further, in this embodiment, the reinforcing member 75 includes the bent portion 79 that bends in the vehicle width direction at an intermediate position in the up-down direction of the reinforcing member, and the notch portion 80 that is formed at a height position overlapping with the bent portion 79. The front side piece 85a and the rear side piece 85b of the bracket 85 are connected to the reinforcing member 75 across the bent portion 79 vertically.

According to this configuration, the reinforcing member 75 is provided with the bent portion 79 and the notch portion 80, and the bracket 85 is connected across the bent portion 79 vertically, so when the load due to a side collision is input to the reinforcing member 75, the portion above the bent portion 79 falls inward in the vehicle width direction first. Since downward deformation of the bracket 85 is facilitated in the portion above the bent portion 79 that falls inward in the vehicle width direction, the amount of deformation of the bracket 85 can be increased.

Further, in this embodiment, the front side piece 85a and the rear side piece 85b of the bracket 85 include the bead portion 87 that includes a plurality of elongated protruding portions protruding forward or rearward and extending in the vehicle width direction.

According to this configuration, the bead portion 87 provided on the front side piece 85a and the rear side piece 85b of the bracket 85 can improve the rigidity of the bracket 85 and further increase the amount of energy absorbed when the bracket 85 is deformed.

Further, in this embodiment, the inner side piece 85c of the bracket 85 includes the attachment portion 89 attaching the retractor 81; and the other bead portion 88 that includes a plurality of elongated protruding portions protruding in the vehicle width direction and extending in the front-rear direction. The attachment portion 89 is provided on the upper side of the inner side piece 85c, and the other bead portion 88 is provided on the lower side of the attachment portion 89 of the inner side piece 85c.

According to this configuration, by arranging the attachment portion 89 for attaching the seat belt retractor 81 on the upper side of the inner side piece 85c of the bracket 85 and providing the other bead portion 88 on the lower side of the attachment portion 89, in the event of a side collision, the seat belt retractor 81 can be guided inward and downward in the vehicle width direction, and the amount of energy absorption associated with the deformation of the bracket 85 can be further increased.

Further, in this embodiment, the side structure of the vehicle body includes: the front door 14A attached to be openable and closable to a side of the vehicle body 10; and the door beam 40 installed inside the front door 14A. In a state where the front door 14A is closed, the rear end of the door beam 40 is arranged at a position overlapping with the reinforcing member 75 and the bracket 85 as viewed in the vehicle width direction.

According to this configuration, the energy of the load due to a side collision input to the door beam 40 can be efficiently absorbed by the reinforcing member 75 and the bracket 85, and the amount of deformation of the door 40 and the center pillar 70 inward in the vehicle width direction (toward the passenger compartment side) can be suppressed.

Further, in this embodiment, the pillar inner panel 71 of the center pillar 70 is formed with the opening 71A in which the retractor 81 is arranged, and the reinforcing member 75 is arranged at a position lower than the upper edge of the opening 71A as viewed in the vehicle width direction.

According to this configuration, the reinforcing member 75 is arranged at a position lower than the upper end of the opening 71A of the pillar inner panel 71, so there is no concern that the pillar inner panel 71 may prevent the reinforcing member 75 from falling inward in the vehicle width direction. Therefore, the load input to the reinforcing member 75 in the event of a side collision can be transmitted to the bracket 85 more reliably, and the deformation of the bracket 85 can be facilitated.

Although embodiments of the disclosure have been described above, the disclosure is not limited to the above embodiments, and various modifications are possible within the scope of technical ideas described in the claims, specification, and drawings.

What is claimed is:

1. A side structure of a vehicle body, comprising:
a side sill extending in a front-rear direction on an outer side of a floor portion of the vehicle body in a vehicle width direction; and
a pillar portion extending upward from the side sill,
wherein the side sill comprises an inner sill that forms an inner side in the vehicle width direction and an outer sill that forms an outer side in the vehicle width direction,
the pillar portion comprises an inner pillar and an outer pillar arranged respectively on the inner side and the outer side in the vehicle width direction,
the side structure of the vehicle body comprises:
a reinforcing member joined to an upper surface of the outer sill on the inner side of the outer pillar in the vehicle width direction; and
a bracket for attaching a seat belt retractor to the side sill,
wherein the bracket is directly fixed to a surface of the reinforcing member and an upper surface of the inner sill, and the bracket is interposed between the surface of the reinforcing member on the inner side in the vehicle width direction and the upper surface of the inner sill.

2. The side structure of the vehicle body according to claim 1, wherein the reinforcing member has a cross-sectional shape that opens toward the outer side in the vehicle width direction, and
a closed cross section is formed by the reinforcing member and a constituent member of the pillar portion.

3. The side structure of the vehicle body according to claim 2, wherein the bracket comprises a front side portion and a rear side portion extending from the reinforcing member toward the inner side in the vehicle width direction, and an inner side portion extending in the front-rear direction on the inner side of the reinforcing member in the vehicle width direction and connecting the front side portion and the rear side portion.

4. The side structure of the vehicle body according to claim 3, wherein the reinforcing member comprises a first reinforcing member arranged in front and a second reinforcing member arranged in rear, and
the front side portion of the bracket is connected to the first reinforcing member, and the rear side portion is connected to the second reinforcing member.

5. The side structure of the vehicle body according to claim 4, comprising a cover member installed between the first reinforcing member and the second reinforcing member in the front-rear direction of the vehicle body, and
a closed cross section is formed by the cover member and an upper surface of the outer sill.

6. The side structure of the vehicle body according to claim 3, wherein the outer pillar comprises a front wall extending toward the inner side in the vehicle width direction on a front side, and a rear wall extending toward the inner side in the vehicle width direction on a rear side, and
the reinforcing member comprises a front joint portion joined to the front wall of the outer pillar, and a rear joint portion joined to the rear wall.

7. The side structure of the vehicle body according to claim 6, wherein the reinforcing member comprises a bent portion that bends in the vehicle width direction at an intermediate position in an up-down direction of the reinforcing member, and a notch portion that is formed at a height position overlapping with the bent portion, and
the front side portion and the rear side portion of the bracket are connected to the reinforcing member across the bent portion vertically.

8. The side structure of the vehicle body according to claim 3, wherein the front side portion and the rear side portion of the bracket comprise a bead portion that comprises a plurality of elongated protruding portions protruding forward or rearward and extending in the vehicle width direction.

9. The side structure of the vehicle body according to claim 3, wherein the inner side portion of the bracket comprises:
an attachment portion attaching the retractor; and
an other bead portion that comprises a plurality of elongated protruding portions protruding in the vehicle width direction and extending in the front-rear direction,
wherein the attachment portion is provided on an upper side of the inner side portion, and the other bead portion is provided on a lower side of the attachment portion of the inner side portion.

10. The side structure of the vehicle body according to claim 3, comprising:
a door attached to be openable and closable to a side of the vehicle body; and
a door beam installed inside the door,
wherein in a state where the door is closed, at least a part of the door beam is arranged at a position overlapping with the reinforcing member and the bracket as viewed in the vehicle width direction.

11. The side structure of the vehicle body according to claim 1, wherein the inner pillar is formed with an opening in which the retractor is arranged, and
the reinforcing member is arranged at a position lower than an upper edge of the opening as viewed in the vehicle width direction.

* * * * *